United States Patent
Javidi et al.

(10) Patent No.: US 12,287,892 B2
(45) Date of Patent: Apr. 29, 2025

(54) SYSTEMS AND METHODS FOR PROTECTING MACHINE LEARNING MODELS AGAINST ADVERSARIAL ATTACKS

(71) Applicants: B. G. NEGEV TECHNOLOGIES AND APPLICATIONS LTD., AT BEN-GURION UNIVERSITY, Beer Sheva (IL); UNIVERSITY OF CONNECTICUT, Farmington, CT (US)

(72) Inventors: Bahram Javidi, Farmington, CT (US); Adrian Stern, Beer Sheva (IL)

(73) Assignees: B. G. NEGEV TECHNOLOGIES AND APPLICATIONS LTD., AT BEN-GURION UNIVERSITY, Beer Sheva (IL); UNIVERSITY OF CONNECTICUT, Farmington, CT (US)

(*) Notice: Subject to any disclaimer, the term of this patent is extended or adjusted under 35 U.S.C. 154(b) by 251 days.

(21) Appl. No.: 18/023,703

(22) PCT Filed: Aug. 27, 2021

(86) PCT No.: PCT/IB2021/057868
§ 371 (c)(1),
(2) Date: Feb. 27, 2023

(87) PCT Pub. No.: WO2022/049469
PCT Pub. Date: Mar. 10, 2022

(65) Prior Publication Data
US 2023/0315879 A1    Oct. 5, 2023

Related U.S. Application Data

(60) Provisional application No. 63/073,461, filed on Feb. 27, 2023.

(51) Int. Cl.
G06F 21/62  (2013.01)
G06F 21/60  (2013.01)

(52) U.S. Cl.
CPC ........ G06F 21/6209 (2013.01); G06F 21/602 (2013.01)

(58) Field of Classification Search
CPC .......................... G06F 21/6209; G06F 21/602
See application file for complete search history.

(56) References Cited

U.S. PATENT DOCUMENTS 5,740,276 A * 4/1998 Tomko .................... G07C 9/37
                                                        235/494
5,793,871 A * 8/1998 Jackson ................ H04K 1/006
                                                         380/54

(Continued)

OTHER PUBLICATIONS

Akhtar et al., "Threat of Adversarial Attacks on Deep Learning in Computer Vision: a Survey," 2018, vol. 6, pp. 14410-14430. IEEE Access, doi: 10.1109/ACCESS.2018.2807385.

(Continued)

*Primary Examiner* — Vance M Little
(74) *Attorney, Agent, or Firm* — The Roy Gross Law Firm, LLC; Roy D. Gross

(57) ABSTRACT

Embodiments pertain to systems configured to and methods for analyzing a scene comprising one or more objects. The system may be configured to perform the following: obtaining a set of optically encrypted image data describing a scene, including applying an optical manipulation to light incoming to an image acquisition device, whereby the image acquisition device outputs the set of optically encrypted image data, and wherein the optical manipulation is based on an encryption key; providing the set of optically encrypted image data to a machine learning model trained in accordance with the encryption key; and receiving from the machine learning model a prediction related to the scene.

20 Claims, 9 Drawing Sheets

(56) References Cited

U.S. PATENT DOCUMENTS

| | | | |
|---|---|---|---|
| 2019/0130110 A1 | 5/2019 | Lee et al. | |
| 2019/0188562 A1* | 6/2019 | Edwards | G06N 5/045 |
| 2019/0220755 A1* | 7/2019 | Carbune | G06N 20/00 |
| 2019/0362072 A1* | 11/2019 | Kesarwani | G06F 21/552 |
| 2020/0134391 A1* | 4/2020 | Assaderaghi | G06V 10/82 |
| 2020/0159924 A1 | 5/2020 | Tran et al. | |
| 2020/0387013 A1* | 12/2020 | Palani | G02F 1/292 |

OTHER PUBLICATIONS

Alfalou et al., "Optical Image Compression and Encryption Methods," Advances in Optics and Photonics, 2009, vol. 1, Issue 3, pp. 589-636. https://doi.org/10.1364/AOP.1.000589.

Athalye et al. (2017), "Synthesizing Robust Adversarial Examples," International Conference on Machine Learning, 10pp.

Kravets et al. "Defending deep neural networks from adversarial attacks on three-dimensional images by compressive sensing," in OSA Imaging and Applied Optics Congress 2021 (3D, COSI, DH, ISA, pcAOP). https://doi.org/10.1364/3D.2021.3Tu1C.1.

Bhagoji et al., "Enhancing Robustness of Machine Learning Systems via Data Transformations," 2018 52nd Annual Conference on Information Sciences and Systems (CISS), Princeton, NJ, USA, 2018, pp. 1-5, doi: 10.1109/CISS.2018.8362326.

Biggio et al., "Wild Patterns: Ten Years After the Rise of Adversarial Machine Learning," Jul. 2018, Pattern Recognition, vol. 84, pp. 317-331. https://doi.org/10.1016/j.patcog.2018.07.023.

Candes et al., "Robust Uncertainty Principles: Exact Signal Reconstruction From Highly Incomplete Frequency Information," Jun. 2004, in IEEE Transactions on Information Theory, vol. 52, No. 2, pp. 489-509, Feb. 2006, doi: 10.1109/TIT.2005.862083.

Carlini et al., "Adversarial Examples Are Not Easily Detected: Bypassing Ten Detection Methods," AISec '17: Proceedings of the 10th ACM Workshop on Artificial Intelligence and Security, Nov. 2017, pp. 3-14, https://doi.org/10.1145/3128572.3140444.

Carlini et al., "Towards Evaluating the Robustness Of Neural Networks," in 2017 IEEE Symposium on Security and Privacy (SP), San Jose, CA, USA, 2017 pp. 39-57. doi: 10.1109/SP.2017.49.

Chen et al., "Advances in Optical Security Systems," Advances in Optics and Photonics, 2014, vol. 6, pp. 120-155. https://doi.org/10.1364/AOP.6.000120.

Cho et al., "Three-dimensional Photon Counting Double-random-phase Encryption," Optics Letters, Sep. 2013, vol. 38 (17), pp. 3198-31201. https://doi.org/10.1364/OL.38.003198.

Clemente et al., "Optical Encryption Based on Computational Ghost Imaging," Jul. 2010, Opt. Lett. Vol. 35, pp. 2391-2393, https://doi.org/10.1364/OL.35.002391.

Das et al., "Keeping the Bad Guys Out: Protecting and Vaccinating Deep Learning With Jpeg Compression," 15 pages, https://doi.org/10.48550/arXiv.1705.02900.

Moosavi-Dezfooli et al., "Universal Adversarial Perturbations," Mar. 2017, Proceedings of the IEEE Conference on Computer Vision and Pattern Recognition (CVPR), 2017, pp. 1765-1773.

Donoho et al., "Compressed Sensing, " Sep. 2014, Information Theory, IEEE Transactions on. 52. 1289-1306. 10.1109/TIT.2006.871582.

Edgar et al., "Principles and Prospects for Single-pixel Imaging," Jan. 2019. Nature Photon 13, 13-20 (2019). https://doi.org/10.1038/s41566-018-0300-7.

Eykholt et al., "Robust Physical-world Attacks on Deep Learning Visual Classification," 2018 IEEE/CVF Conference on Computer Vision and Pattern Recognition, Salt Lake City, UT, USA, 2018, pp. 1625-1634, doi: 10.1109/CVPR.2018.00175.

Finlayson et al., "Adversarial Attacks Against Medical Deep Learning Systems," Februray 2019, pp. 9.

Finlayson et al., "Adversarial Attacks on Medical Machine Learning," Science, Mar. 2019, vol. 363 (6433), pp. 1287-1289. doi: 10.1126/science.aaw4399. PMID: 30898923; PMCID: PMC7657648.

Frauel et al., "Resistance of the Double Random Phase Encryption Against Various Attacks," Optics express, Aug. 2007, vol. 15 (16), pp. 10253-10265. https://doi.org/10.1364/OE.15.010253.

Gan et al., "Fast Compressive Imaging Using Scrambled Block Hadamard Ensemble," 2008 16th European Signal Processing Conference, Lausanne, Switzerland, 2008, pp. 1-5.

Goodfellow et al., "Explaining and Harnessing Adversarial Examples," CoRR, abs/1412.6572, 11pp.

Heaven et al., "Why Deep-learning Ais Are So Easy to Fool," Nature, Oct. 2019, vol. 574 (7777), pp. 163-166. DOI: 10.1038/d41586-019-03013-5.

PCT International Preliminary Report on Patentability for Application No. PCT/IB2021/057868 mailed Mar. 16, 2023, 8 Pages.

PCT International Search Report and Written Opinion for Application No. PCT/IB2021/057868 mailed Oct. 19, 2021, 9 Pages.

Javidi et al., "Cell Identification Using Single Beam Lensless Imaging With Pseudo-random Phase Encoding," Optics Letters, Aug. 2016, vol. 41 (15), pp. 3663-3666. https://doi.org/10.1364/OL.41.003663.

Javidi et al., "Roadmap on optical security," Journal of Optics, 2016, pp. 42. DOI 10.1088/2040-8978/18/8/083001.

Katzir et al., "Gradients Cannot Be Tamed: Behind the Impossible Paradox of Blocking Targeted Adversarial Attacks," IEEE Transactions on Neural Networks and Learning Systems, Jan. 2021, vol. 32 (1), pp. 128-138.

Kravets et al., "3d Compressive Lidar Imaging Using Multiscale-ordered Hadamard Basis," n Imaging and Applied Optics 2018 (3D, AO, AIO, COSI, DH, IS, LACSEA, LS&C, MATH, pcAOP), OSA Technical Digest (Optica Publishing Group, 2018), paper 3W2G.3.

Kravets et al., "Compressive Imaging for Defending Deep Neural Networks From Adversarial Attacks," Optics Letters, Apr. 2021, vol. 46, pp. 1951-1954. https://doi.org/10.1364/OL.418808.

Kravets et al., "Compressive Ultraspectral Imaging Using Multiscale Structured Illumination," Aug. 2019, vol. 58, Appl. Opt. 58, F32-F39 (2019), https://doi.org/10.1364/AO.58.000F32.

Krizhevsky et al., "Imagenet Classification With Deep Convolutional Neural Networks," Communications of the ACM, vol. 60, Issue 6, May 24, 2017, pp. 84-90. https://doi.org/10.1145/3065386.

Kurakin et al., "Adversarial Examples in the Physical World," Feb. 2017, 14pp. arXiv:1607.02533v3.

Li et al., "Compressive Optical Image Encryption," Scientific Reports, 5:10374. May 20, 2015;5:10374. doi: 10.1038/srep10374. PMID: 25992946; PMCID: PMC4438618.

Matoba et al., "Optical Techniques for Information Security," in Proceedings of the IEEE, vol. 97, No. 6, pp. 1128-1148, Jun. 2009, doi: 10.1109/JPROC.2009.2018367.

Rachlin et al., "The Secrecy of Compressed Sensing Measurements," 2008 46th Annual Allerton Conference on Communication, Control, and Computing, Monticello, IL, USA, 2008, pp. 813-817, doi: 10.1109/ALLERTON.2008.4797641.

Refregier et al., "Optical Image Encryption Based on Input Plane and Fourier Plane Random Encoding," Optics Letters, Apr. 1995, vol. 20 (7), pp. 767-769. https://doi.org/10.1364/OL.20.000767.

Ren et al., "Adversarial Attacks and Defenses in Deep Learning," Engineering, Mar. 2020, vol. 6(3), pp. 346-360. https://doi.org/10.1016/j.eng.2019.12.012.

Rivenson et al., "Single Exposure Super-resolution Compressive Imaging by Double Phase Encoding," Opt. Express 18, 15094-15103 (2010), https://doi.org/10.1364/OE.18.015094.

Sharif et al., "A General Framework for Adversarial Examples With Objectives," ACM Transactions on Privacy and Security, Jun. 2019, vol. 22, 16:30. https://doi.org/10.1145/3317611.

Sher et al., "Low Intensity Lidar Using Compressed Sensing and a Photon Number Resolving Detector," Proceedings of SPIE, vol. 10546, 105460J-7. https://doi.org/10.48550/arXiv.1802.09354.

Soldevila et al., "Single-pixel Polarimetric Imaging Spectrometer by Compressive Sensing," Applied Physics B, 2013, vol. 113, pp. 551-558. https://doi.org/10.1007/s00340-013-5506-2.

Song et al., "Defense Against Adversarial Attacks With Saak Transform1," 7pp., ArXiv, abs/1808.01785.

Su et al., "One Pixel Attack for Fooling Deep Neural Networks," IEEE Transactions on Evolutionary Computation, Oct. 2019, vol. 23, pp. 828-840. https://doi.org/10.48550/arXiv.1710.08864.

(56) References Cited

OTHER PUBLICATIONS

Szegedy et al., "Intriguing Properties of Neural Networks," 10pp. https://doi.org/10.48550/arXiv.1312.6199.

Takhar et al., "A New Compressive Imaging Camera Architecture Using Optical-domain Compression," Proceedings of SPIE, vol. 6065, Computational Imaging IV; 606509 (2006). https://doi.org/10.1117/12.659602. Event: Electronic Imaging 2006, 2006, San Jose, California, United States.

Zhang et al., "A Review of Compressive Sensing in Information Security Field," in IEEE Access, vol. 4, pp. 2507-2519, 2016, doi: 10.1109/ACCESS.2016.2569421.

Zhou et al., "Learning Complex Scattering Media for Optical Encryption," Optics letters, Sep. 15, 2020, vol. 45 (18), pp. 5279-5282. https://doi.org/10.1364/OL.400174.

Zhou et al., "Machine-learning Attacks on Interference-based Optical Encryption: Experimental Demonstration," Optics Express, Sep. 2019, vol. 27 (18), pp. 26143-26154. https://doi.org/10.1364/OE.27.026143.

Liu et al. (2013). A review of optical image encryption techniques. Optics & Laser Technology.-. 10.1016/j.optlastec.2013.05.023.

Byrne J., et al., "Key-Nets: Optical Transformation Convolutional Networks for Privacy Preserving Vision Sensors," Arxiv.org, 2020, pp. 1-16, Retrieved form [https://arxiv.org/abs/2008.04469].

Extended European Search Report for European Application No. 21863801.3, mailed Aug. 6, 2024, 06 Pages.

He Y., et al., "Towards Privacy and Security of Deep Learning Systems: A Survey," Arxiv.org, 2019, pp. 1-23, Retrieved from [https://arxiv.org/abs/1911.12562v1].

* cited by examiner

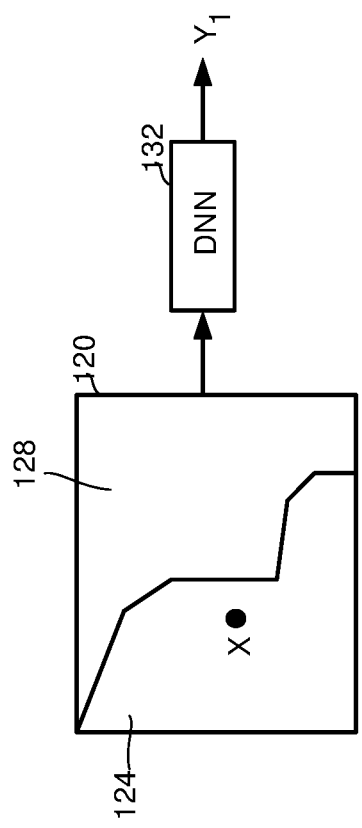
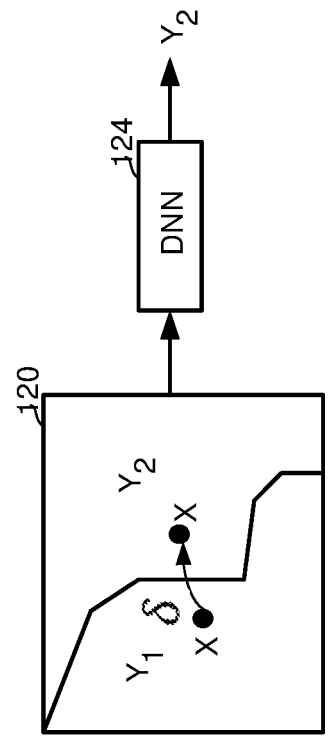
FIG. 1B
FIG. 1C

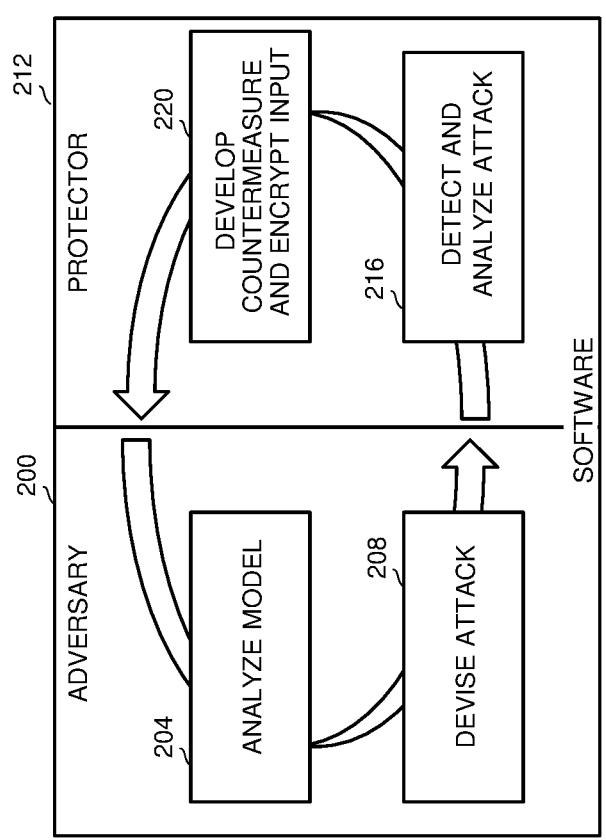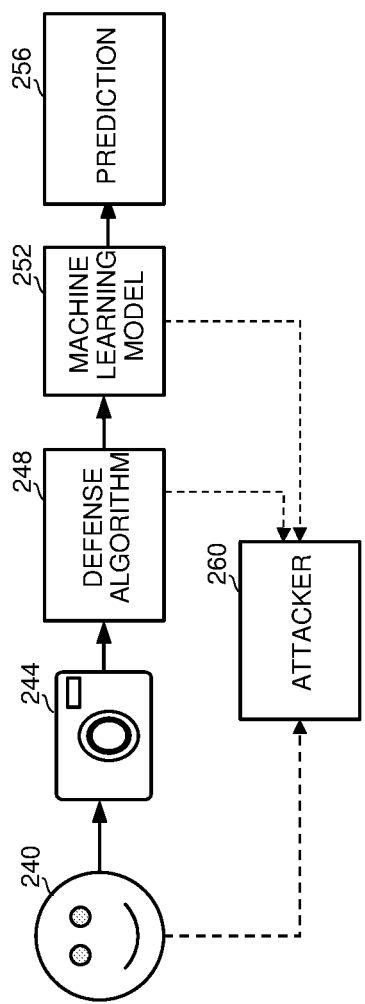
FIG. 2A
FIG. 2B

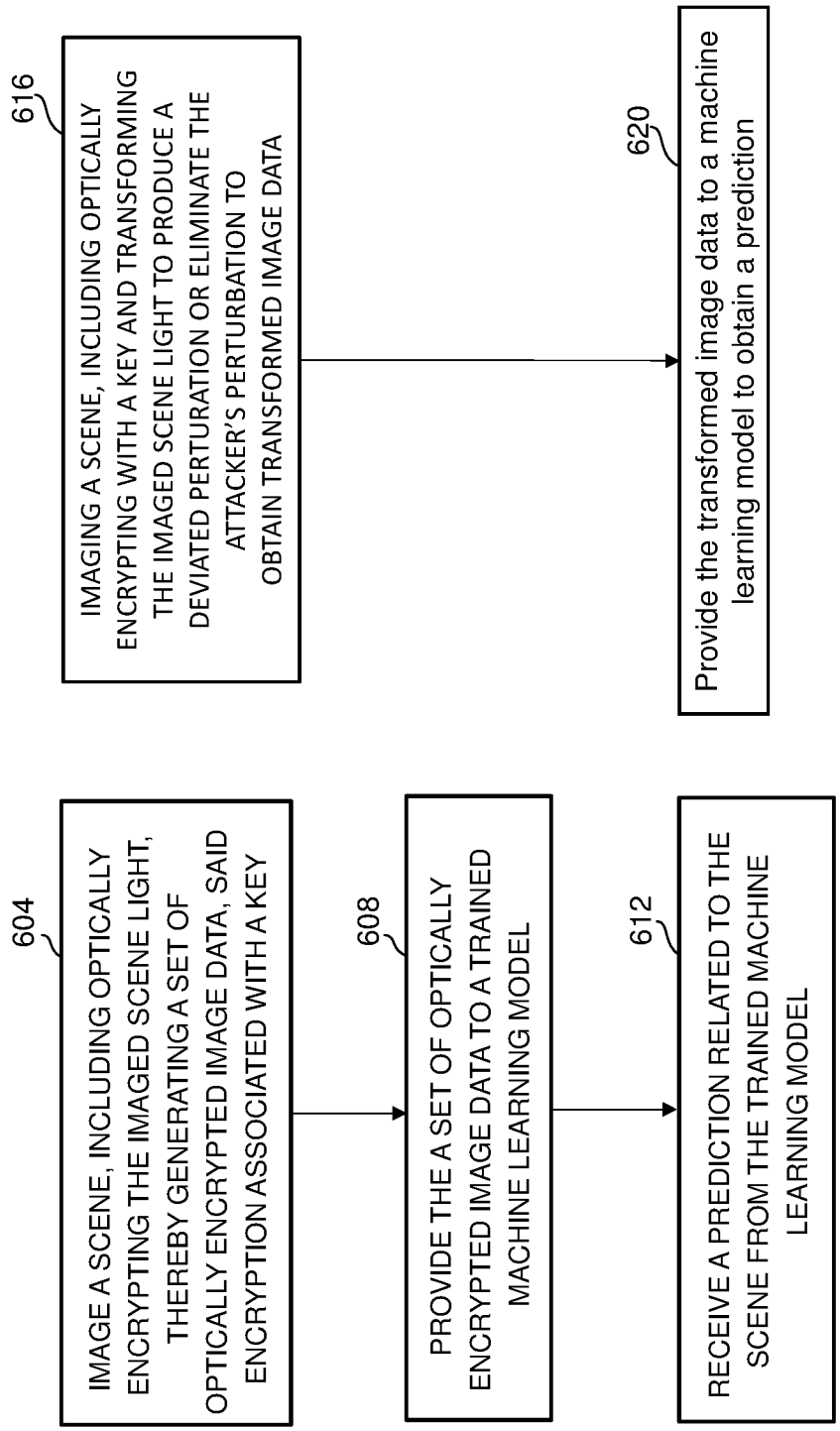

SYSTEMS AND METHODS FOR PROTECTING MACHINE LEARNING MODELS AGAINST ADVERSARIAL ATTACKS

CROSS-REFERENCE TO RELATED APPLICATIONS

This patent application is a National Phase of PCT Patent Application No. PCT/IB2021/057868 having International filing date of Aug. 27, 2021, which claims priority and benefit from U.S. provisional patent application No. 63/073,461, filed Sep. 2, 2020, the contents of which are all incorporated herein by reference in their entirety.

TECHNICAL FIELD

The present disclosure relates relates to machine learning, and more specifically to protecting machine learning models against adversarial attacks.

BACKGROUND

In recent years, machine learning models and in particular Deep Neural Networks (DNNs) are gaining more and more popularity in almost every scientific and practical field. These models are used for a vast range of purposes, including but not limited to classifying images, analyzing audio, or the like. Typically, in the case of classifying images, an engine may be trained upon a plurality of images, each labeled according to its subject, content or a certain aspect or feature thereof. The training adjusts the internal weights associated with features of the image, thereby "teaching" the engine how to classify images in accordance with the labels. In runtime, further images may be provided to the model, to which the model applies the learned weights to predict a label for the image.

Despite their impressive performance, machine learning models and in particular DNNs can be fatally attacked. One known attack method comprises introducing to the input image small or unperceivable perturbations, which are unnoticeable by a human eye, which causes the model to provide a wrong prediction. FIG. 1A shows such an example of an attacked image and a resulting classification error.

Image 100 is successfully classified by a trained DNN as a panda. As the perturbation, pattern 104 may be added to image 100, to produce image 108, which to the human eye looks very similar or even identical to image 100. Due to the added perturbation, the trained DNN, however, wrongly classifies image 108 as a Gibbon. This kind of attack may use knowledge about the internal structure and operation of the DNN, and/or about the operation of the DNN, also referred to as a "gray box" in order to devise an attack on the object to be analyzed. Once such attacked object is provided to the DNN, the DNN will divert the output from the correct one, and produce a wrong prediction. The attack may be devised as a targeted or non-targeted attack such that the wrong prediction output by the DNN may be a specific wrong prediction or any wrong prediction, respectively.

Referring now to FIG. 1B and FIG. 1C, demonstrating a perturbation introduced by an attacker to the input of a machine learning engine, referred to as a machine learning (ML), which causes the ML to provide a wrong prediction.

Diagram 120 shows a two dimensional space of values to be provided to a trained ML 132. In some embodiments, ML 132 can be a Deep Neural Network. ML 132 may be adapted to perform any ML task, such as classification, detection, segmentation, or the like. For example, ML 132 can perform classification into two classes, wherein points in area 124 are classified as $Y_1$, while points in area 128 are classified as $Y_2$. Thus, as shown schematically in FIG. 1B, when ML 132 is provided with the coordinates of point X, the prediction is $Y_1$. Mathematically, the operation of ML 132 may be described as $\hat{y}=D_\theta(x)$, wherein X is the input point, $D_\theta$ is the operation performed by the machine learning model, and $\hat{y}$ is the prediction that is output by the machine learning model.

As shown schematically with respect to FIG. 1C, an adversary may design an attack which modifies x into x', such that $D_\theta$ will predict an undesired output $\hat{y}'$: $\hat{y}'=D_\theta(x')$ such that $\hat{y}' \neq \hat{y}$.

For example, the adversary may introduce a perturbation in which $\delta$ is added to x:$x'=x+\delta$. Such perturbations can be crafted from full or partial knowledge of ML 132, $D_\theta$ and the distribution of the training set. For example, some techniques may use the gradient of the cost (also referred to as loss) function.

In this case, as shown in FIG. 1C, ML 132 which predicts correctly $D_\theta(x)=Y_1$ is now caused to output a prediction of $Y_2$, since $D_\theta(x')=Y_2 \neq Y_1$.

It will be appreciated that ML 132 and the introduced perturbation are a simplified example intended for demonstration purposes. In real life examples, an attacker may introduce a perturbation to an image captured by a medical device, such that an automated system will provide a wrong diagnosis. In another example, an attacker may introduce a perturbation to an image captured by a camera of an autonomous vehicle, such that a system within the vehicle will take a wrong decision and cause severe damage to the passengers, the vehicle, or other persons or property in the vicinity of the vehicle.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

FIG. 1B and FIG. 1C schematically demonstrate a perturbation made by an attacker and its effect.

FIG. 2A is an illustration of the arm race between attackers and protectors with prior art systems.

FIG. 2B is schematic illustration of a generalized protection scheme provided by prior art systems.

FIG. 6A is a flowchart of a method for securely analyzing imaged scenes, in accordance with some exemplary embodiments of the disclosure.

FIG. 6B is a flowchart of another method for securely analyzing imaged scenes, in accordance with some exemplary embodiments of the disclosure.

DETAILED DESCRIPTION

Figure 1A:
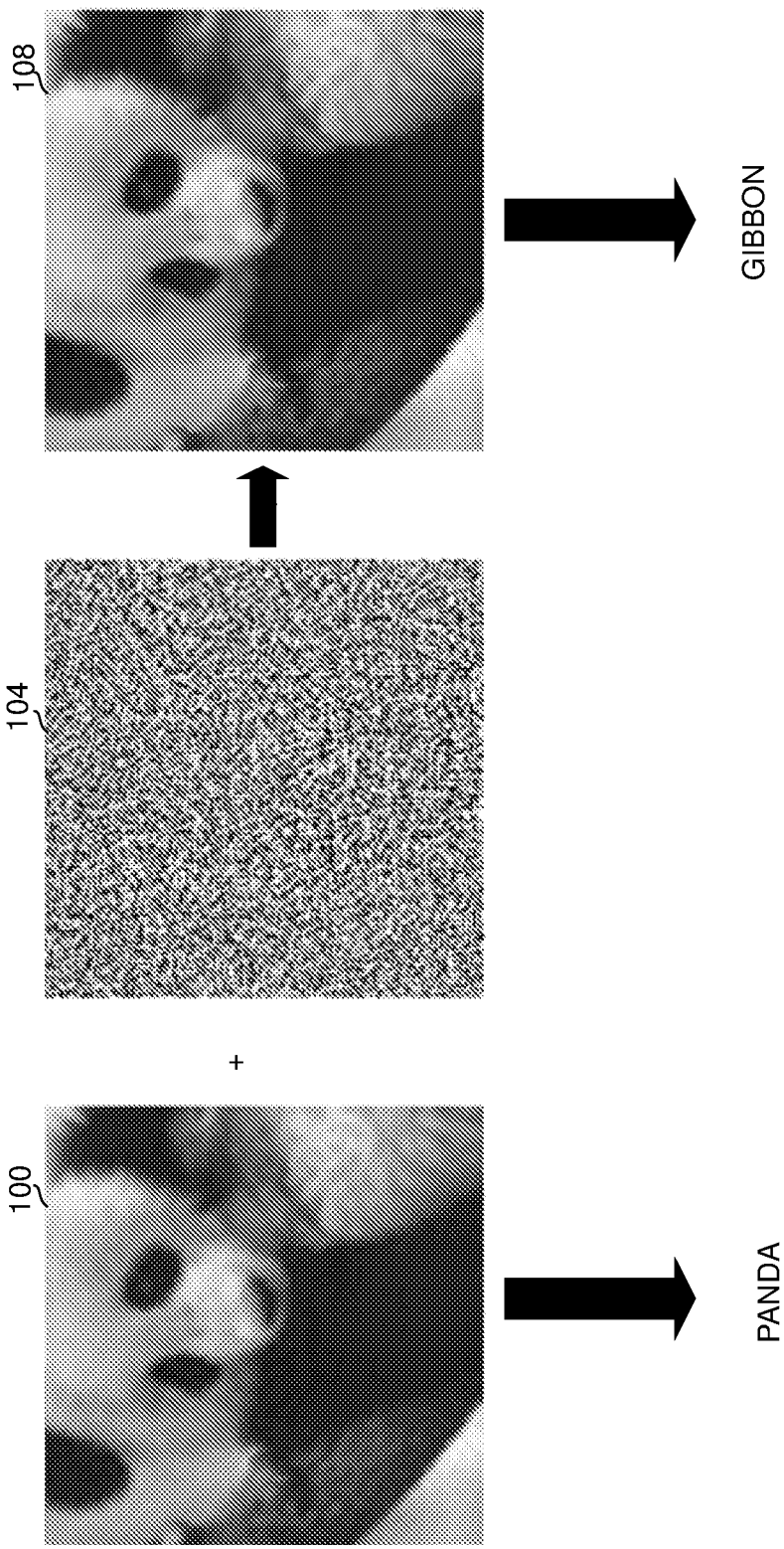
FIG. 1A shows an example of an attacked image and a resulting prediction error.

The disclosure relates to a method and system for protecting the image analysis performed by machine learning models such as DNNs, against adversarial attacks.

Adversarial attacks may be mathematically formulated as follows:

A model F is given, which is trained on a dataset $\{x_i, y_i\}$ for i=1 ... N, where $x_i$ is the input image and $y_i$ is the label, such that F(x)=y where x is a given image and y is the prediction for the image, also referred to as output or label. An adversarial attack method may seek to introduce a perturbation δ to generate an adversarial image, x', such that, for example:

D(x,x')<η, i.e., the distance D between x and x' according to a predetermined metrics is smaller than some constant η, and F(x')=F(x+δ)≠y for a non-targeted attack and F(x')=t≠y for a targeted attack intended to obtain a t prediction.

Various defense solutions have been proposed for fighting adversarial attacks. Some solutions are designed to detect attack attempts, wherein an alert may be raised on potentially adversarial examples in order to reject them. Other solutions attempt to correct the machine learning model such that it achieves its original performance regardless of the attack the image has undergone. Yet additional solutions attempt to modify the input to the model as a means of defense against adversarial attacks.

As in any attack on assets, a constant struggle exists between attackers and protectors. Referring now to FIG. 2A, showing an illustration of the arms race between attackers and protectors with prior art systems, referred to as reactive arms race.

Adversary 200 attempts, and often succeeds, as indicated by block 204, to analyze the machine learning model and possibly the defending tools applied to the system. For example, with a "white box" or "gray box" attack scenario, adversary 200 may use the model's cost function, and in a "black box" attack scenario, adversary 200 may use a plurality of inputs and outputs of the model, which enable adversary 200 to figure out how the model operates to correctly classify the input. As indicated by block 208, the adversary devises an attack on the system, for instance, by introducing an effective perturbation to the input and/or by manipulating the model such that the model produces a wrong prediction.

Protector 212, which may be the owner or the designer of the system, may detect and analyze 216 how the attacker operates and what it does to the input, and in response, as indicated by block 220, develop a counter measure. For example, Protector 212 may identify an attack by statistically analyzing the model weight in different levels. Protector 212 may then apply the counter measure, for example apply a new defense scheme. The new defense scheme in turn stimulates adversary 200 to detect and analyze, as indicated by block 204, the strengthened scheme. This cycle, also referred to as arms race, may repeat indefinitely, as each side analyzes the other side's operations and overcomes them.

Some currently known defense techniques employ digital encryption techniques, for example by employing some image processing, statistics, or Machine Learning (ML) methods towards modifying the input encryption or the engine, or decrypting the same.

Referring now to FIG. 2B, showing a schematic illustration of a generalized protection scheme provided by prior art systems, in which an object 240, or any other scene is to be captured and analyzed.

An image of object 240 may be captured by optical capture or imaging device 244, comprising an optical system and a sensor configured to generate an image dataset representing a pixel map of an image. The pixel map may be implemented as a matrix of values, wherein each entry in the matrix represents the amount of light captured from the scene. The pixel map is thus a digital representation of an image of the scene comprising object 240.

In some embodiments, defense algorithm 248 may operate on the pixel map (or image dataset), to defend the image dataset or the system against an attack.

The image dataset may then be provided to a trained machine learning model 252 such as a DNN.

Machine learning model 252 may have been trained using, for example, supervised learning upon a plurality of images and corresponding labels, to obtain machine learning parameter values to be assigned to various features of the input images, such that the model outputs the corresponding labels. The labels may represent, for example, classification of each training image into one of a plurality of classes based on content and/or other features of the training image. Once trained, machine learning model 252 is adapted to receive as input a further image, to apply the functions and parameters thereon, and obtain a corresponding prediction.

In some cases, encryption may be applied to the input, and training may be performed upon encrypted and labeled images. It will be appreciated, however, that machine learning model 252 may additionally or alternatively be created using unsupervised learning such as, for example, data clustering.

Machine learning model 252 may thus output a prediction 256 for the image dataset representing an image, such as a classification of the image dataset into one of the plurality of predefined classes.

An attacker 260 may have full ("white box") or partial ("Gray box") access to the ML architecture, parameters, and training conditions, in particular when an off-the shelf model is used. In these cases, the attacker may analyze (e.g., reverse engineer) the model to design a perturbation to the input, in order for the model to produce a wrong prediction.

If the model is augmented with software defense, attacker 260 may also have to include the defense in calculating the perturbation. In cases where the attacker has no access to the ML ("black box"), the attacker may aim at designing a perturbation based on approximation of the operation of the ML enabling the attacker 260 to determine the perturbations that need to be applied to object 240 being imaged and/or the image dataset descriptive of the object, such that machine learning model 252 will produce a particular wrong classification in the case of a targeted attack, or any wrong classification in the case of non-targeted attack. Some forms of software defense may include applying encryption algorithms.

It will be appreciated that protecting DNN systems, as well as other systems, is a more difficult task than breaking them, since a defense must secure against all conceivable present and future attacks, whereas an attack need only defeat one or more specific defenses.

One solution of the disclosure relates to encrypting the input to the system, wherein the encryption is performed in the optical domain, prior to digitization. This solution may remedy the imbalance between the protector and attacker by involving different tools in the protector's operation, and due to the specific nature of the optical encryption, making it practically impossible for an attacker to break the encryption, as further detailed below.

Figure 3A:
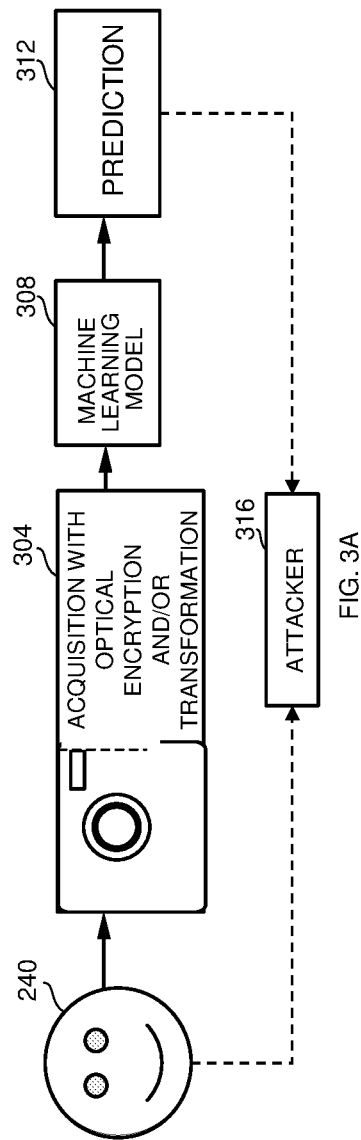
FIG. 3A is schematic illustration of a generalized protection scheme, in accordance with embodiments of the disclosure.

Additional reference is made to FIG. 3A, showing a schematic illustration of a protection scheme in accordance with the disclosure.

An object 240 of a scene may be captured by an imaging device 304 that is adapted to optically encrypt image-bearing light coming from the scene, to acquire an image of object 240. Thus, before incoming image-bearing light encoding scene information comprising the object light is incident onto a sensor of imaging device 304 and acquired, the image-bearing light may be optically manipulated, such that the resulting pixel map includes an optically encrypted image of object 240. Optical manipulation may be performed before or after the light passes through the optical system of imaging device 304, between elements of the optic system, or any combination of the above.

The optically manipulated image may be provided to machine learning model 308 trained with correspondingly optically manipulated training images. Such "specially trained" machine learning model 308 may then provide a correct prediction 312. The expression "correspondingly optically manipulated training images" relates to images encrypted in the same manner as produced by imaging device 304.

Even in the event attacker 316 obtains knowledge about machine learning model 308, the attacker may still be unable to reverse engineer the encryption. Hence, attacker 316 may still be unable to modify the object or the image dataset such that that the ML model outputs a wrong prediction. Even with knowledge about features and/or characteristics of the machine learning model 308, it will still provide the desired prediction.

Figure 3B:
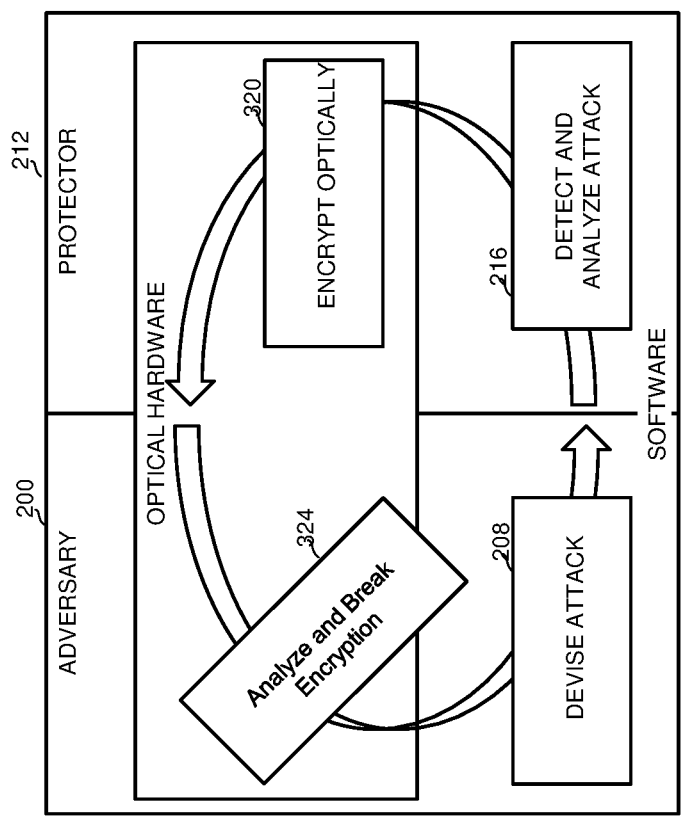
FIG. 3B is an illustration of the arm race with the scheme of FIG. 3A applied, in accordance with the disclosure.

Referring now to FIG. 3B, showing an illustration of the arms race with the scheme of FIG. 3A applied. Encryption 320 is now performed in the optical domain. In some examples, software-based encryption may also be added.

Analyzing and breaking encryption 324 will thus require adversary 200 to operate in a new and complex environment, involving, for instance, gaining physical access to imaging device 304 for decrypting the optical encryption, in addition to gaining knowledge about the operation of the other components in the system, such as the machine learning model, which may or may not be software-based.

Optical encryption may be associated with a key, that describes the encryption, including for example the encryption type such as adding diffraction, and the encryption details, such as the diffraction parameter values.

An important advantage of optical encryption relies in its inherent features, in that incoming image-bearing light may be processed, including encrypted,) in parallel, on for instance some or all spatial and/or spectral elements of the entire image.

Moreover, optical-based manipulation (e.g., encryption) methods possess multi-dimensional and multi-parameter capabilities. Multiple optical parameters, such as wavelength, interference, polarization, phase, coherence, and/or photon rate, can be employed (e.g., altered) for encryption. Thus, due to the parallel processing and the multiple degrees of freedom offered by optical encryption schemes, the encryption key space that can be realized is huge.

Even comparatively simple optical image encryption, such as Double Random Phase Encoding (DRPE) designs can generate a key space having a size in the order of magnitude of $O(10^{10})$-$O(10^{16})$. This implies that these techniques are secure to brute-force attacks, as it is extremely unlikely for an attacker to discover the exact keys by applying exhaustive search.

In scenarios in which the attacker wishing to decrypt the image can apply Known Plaintext Attacks (KPA), some optical encryption designs may exhibit vulnerability to such attacks. However, the vulnerability can be mitigated or completely removed by employing stricter measures such as chaotic encoding, key alternation, nonlinear processing, e.g., photon counting.

Moreover, optical encryption requires attackers to possess and implement multidisciplinary knowledge, including for example optical theories, optical signal processing, digital image processing, cryptography, and computer technologies.

Figure 4A:
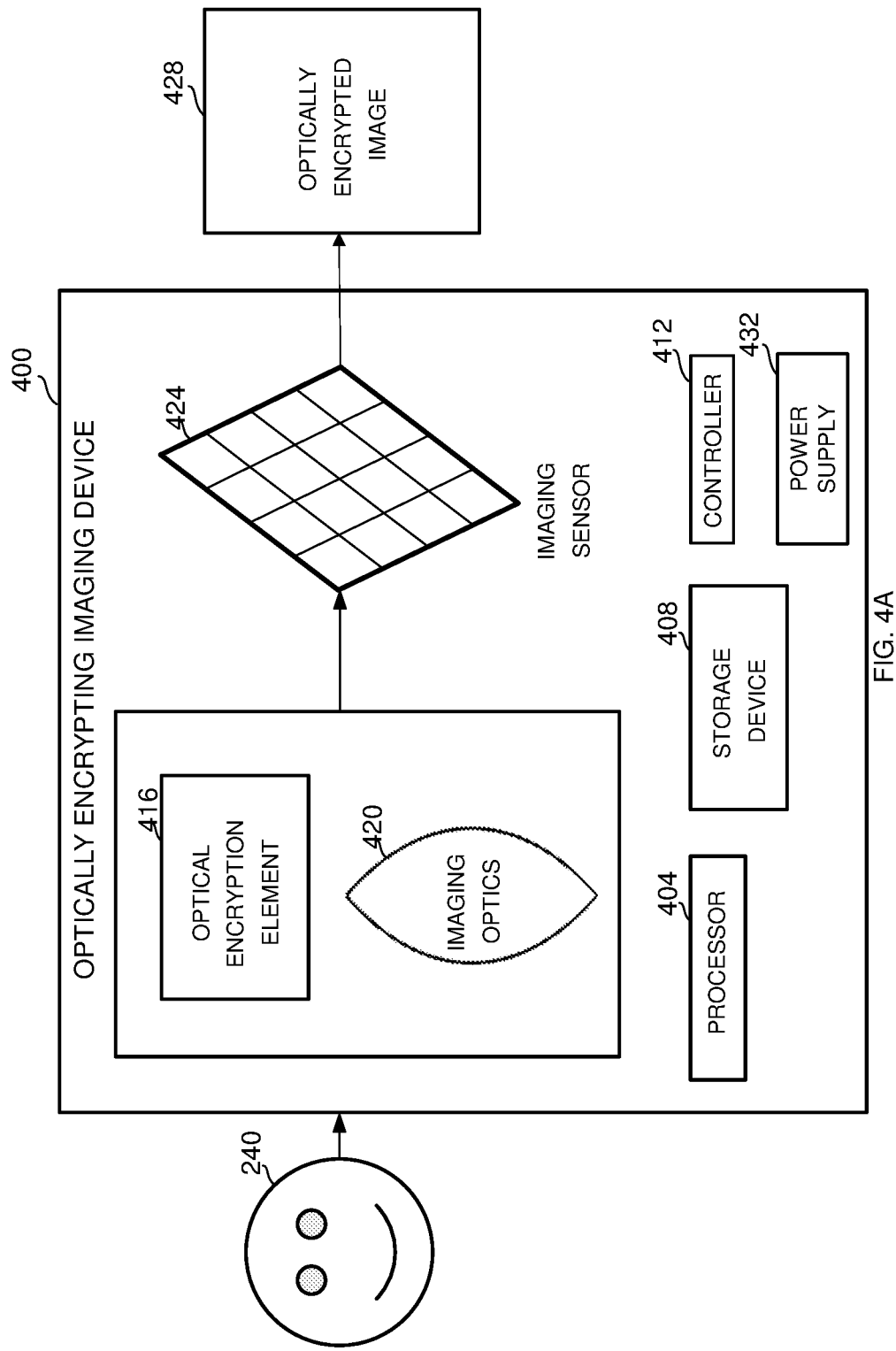
FIG. 4A is a schematic illustration of an imaging setup comprising an optically encrypting imaging device, in accordance with some exemplary embodiments of the disclosure.

Referring now to FIG. 4, showing a schematic illustration of an optically encrypting imaging device 400, in accordance with some exemplary embodiments of the disclosure.

Optically encrypting imaging device 400 may comprise a processor 404 which may be one or more Central Processing Units (CPU), a microprocessor, an electronic circuit, an Integrated Circuit (IC) and/or the like; and a storage device 408. Processor 404 may be configured to provide the required functionality, for example by executing software code instructions stored in storage device 408, retrieving data from storage device 408 and/or loading data to storage device 408 for implementing or activating one or more modules, e.g., as detailed below.

Storage device 408, may be a hard disk drive, a Flash disk, a Random Access Memory (RAM), a memory chip, or the like, storing data, computer codes representing algorithms and/or machine learning models.

Optically encrypting imaging device 400 may comprise an imaging sensor 424, for converting received an encrypted image-bearing light into a digital image, and in accordance with the disclosure, an optically manipulated (encrypted) image dataset 428, implemented for example as a pixel map, as described above.

Optically encrypting imaging device 400 may comprise imaging optics 420, comprising for example one or more lenses, filters, apertures, stops, and/or the like, as in any camera.

Optically encrypting imaging device 400 may comprise any one or more manipulation optics 416 comprising components that may affect the image-bearing light before the image-bearing light impinges onto imaging sensor 424. For example, manipulation optics 416 may comprise one or more lenses, diffraction gratings, masks, prisms, polarizers, retarders, waveguides, beam splitters, combiners, mirrors, interferometers, apertures, slots, photonic crystals, metamaterials, amplifiers, frequency shifters, modulators, an additional object attached thereto, a physical object such as a mask with an aperture or a slot, or the like, designed to affect one or more characteristics of the image-bearing light.

It will be appreciated that manipulation optics 416 may be configured to apply manipulations to the incoming light before and/or after the light passes through imaging optics 420. In some embodiments, manipulation optics 416 and imaging optics 420 may be interleaved such that one or more optical manipulation components may be located between two components of imaging optics 420, or vice versa. In some examples, a same component may function as a manipulation optics 416 and as imaging optics 420.

In some embodiments, manipulation optics 416 can assume a plurality of states and thus affect (e.g., modulate) the light in different manners.

In some examples, manipulation optics 416 may be controllably to controllably assume various states. For example, optically encrypting imaging device 400 may comprise a controller 412 configured to control manipulation optics 416 and thus affect the light and change the resulting image, thereby encrypting it. For example, controller 412 may be operative to change parameter values related to wavelength, polarization, phase, or photon rate of the light; parameter values related to filtration; diffraction; spatial geometry; controlling parameter values of manipulation optics for implementing, for example, single random phase keys; double random phase keys; pseudo-random phase encoding; compressive imaging; or any combination of the aforesaid.

In some exemplary embodiments, manipulation optics 416 may include a Liquid Crystal Cell that, depending on whether it is subjected to a voltage difference or not, can change the polarization of the light propagating through the cell.

In some exemplary embodiments, storage device 408 may retain program code operative to cause processor 404 to provide controller 412 with, e.g., Rule-based and/or machine learning model-based, to change one or more operating parameter values of manipulation optics 416 in accordance with the stored instructions.

Imaging device 400 may include a power supply 432 for powering the various components of the device.

Figure 4B:
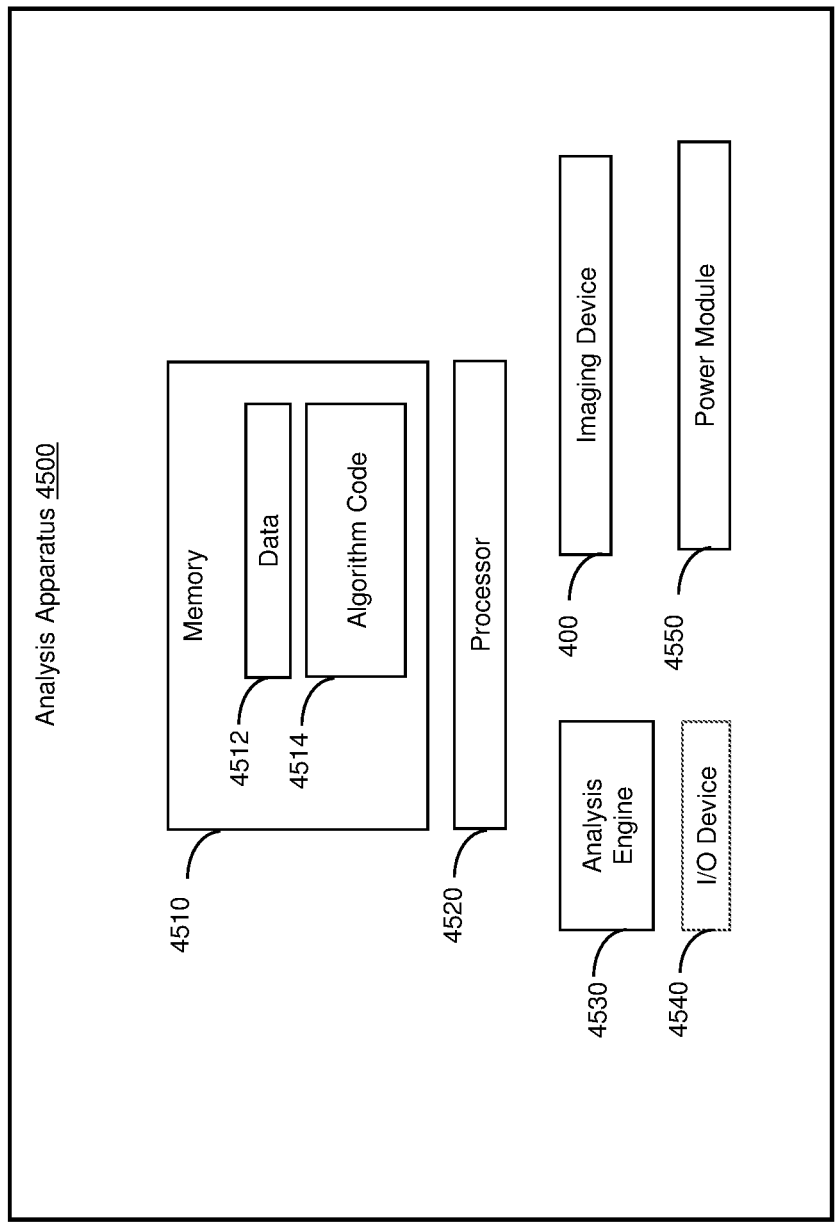
FIG. 4B is a schematic illustration of an apparatus adapted to output a prediction, in accordance with some exemplary embodiments of the disclosure.

Additional reference is made to FIG. 4B. According to some embodiments, an analysis apparatus 4500 to analyze encrypted or transformed image data for providing a prediction output.

In some examples, analysis apparatus 4500 may comprise imaging device 400. In some examples, imaging device 400 may incorporate the analysis functionalities for providing a prediction. In some examples, analysis apparatus 4500 may be configured to receive image data for providing a prediction. In some examples, the image data may be transformed and optically decrypted. In some other examples, the image data may be transformed, and decrypted by the apparatus to produce the transformed and optically decrypted image for input into an off-the-shelf ML model.

Merely to simplify the discussion that follows, without being construed in a limiting manner, imaging device 400 is herein shown as being part of analysis apparatus 4500. In some examples, imaging device 400 (or parts thereof) may be separate from analysis apparatus 4500.

Analysis apparatus 4500 may include a memory 4510 configured to store data 4512 and algorithm code and/or machine learning code 4514, and a processor 4520. Processor 4520 may be configured to execute algorithm and/or machine learning code 4514 for the processing of data 4512 which may result in the implementation of an analysis engine 4530.

Analysis engine 4530 may implement various functionalities of analysis apparatus 4500, e.g., as outlined herein.

Although some of the components, modules, functional engines and/or processes are shown as being part of analysis apparatus 4500 this should by no means be construed in a limiting manner. Accordingly, some of the subsystems, devices, components, modules, functional engines and/or processes of the analysis apparatus 4500 may be run and/or comprised in a platform external to analysis apparatus 4500. However, for simplicity and without be construed in a limiting manner, the description and claims may refer to a single module and/or component. For example, although processor 4520 may be implemented by several processors, the following description will refer to processor 4520 as the component that conducts all the necessary processing functions of analysis apparatus 4500.

The one or more computing platforms may include a multifunction mobile communication device also known as "smartphone", a personal computer, a laptop computer, a tablet computer, a server (which may relate to one or more servers or storage systems and/or services associated with a business or corporate entity, including for example, a file hosting service, cloud storage service, online file storage provider, peer-to-peer file storage or hosting service and/or a cyberlocker), personal digital assistant, a workstation, a wearable device, a handheld computer, a notebook computer, a vehicular device and/or a stationary device.

Memory 4510 may be implemented by various types of memories, including transactional memory and/or long-term storage memory facilities and may function as file storage, document storage, program storage, or as a working memory. The latter may for example be in the form of a static random access memory (SRAM), dynamic random access memory (DRAM), read-only memory (ROM), cache and/or flash memory. As working memory, memory 4510 may, for example, include, e.g., temporally-based and/or non-temporally based instructions. As long-term memory, memory 4510 may for example include a volatile or non-volatile computer storage medium, a hard disk drive, a solid state drive, a magnetic storage medium, a flash memory and/or other storage facility. A hardware memory facility may for example store a fixed information set (e.g., software code) including, but not limited to, a file, program, application, source code, object code, data, and/or the like.

The term "processor", as used herein, may additionally or alternatively refer to a controller. Processor 4520 may be implemented by various types of processor devices and/or processor architectures including, for example, embedded processors, communication processors, graphics processing unit (GPU)-accelerated computing, soft-core processors and/or general purpose processors.

In some embodiments, analysis engine 4530 may be configured to receive transformed and, optionally, already decrypted image data via an I/O device 4540 to provide a prediction (e.g., classification) with respective to the received optically encrypted or transformed image data. In some embodiments, the received transformed image data has yet to be decrypted prior to providing it as an ML input to obtain a related prediction.

As an input device, I/O device 4540 may include, for example, I/O device drivers, device interfaces (e.g., a Universal Serial Bus interface), or a wired and/or wireless communication module. The communication module may include a network interface drivers (not shown) for enabling the transmission and/or reception of data over a network infrastructure. A device driver may for example, interface with a keypad or to a USB port. A network interface driver may for example execute protocols for the Internet, or an Intranet, Wide Area Network (WAN), Local Area Network (LAN) employing, e.g., Wireless Local Area Network (WLAN)), Metropolitan Area Network (MAN), Personal Area Network (PAN), extranet, 2G, 3G, 3.5G, 4G, 5G, 6G mobile networks, 3GPP, LTE, LTE advanced, Bluetooth® (e.g., Bluetooth smart), ZigBee™, near-field communication (NFC) and/or any other current or future communication network, standard, and/or system.

As an output device, I/O device 4540 may comprise, for example, a display device configured to display one or more images captured by a sensor and include, for example, head mounted display (HMD) device(s), first person view (FPV) display device(s), a monitor, a screen, a touch-screen, a flat panel display, a Light Emitting Diode (LED) display unit, a Liquid Crystal Display (LCD) display unit, a plasma display unit. In some examples, I/O device 4540 may comprise one or more audio speakers or earphones, device interfaces (e.g., a Universal Serial Bus interface), and/or other suitable output devices.

Analysis apparatus 4500 may include a power module 4550 for powering the various components of the device.

A power supply, as mentioned herein, may for example comprise an internal power supply (e.g., a rechargeable battery) and/or an interface for allowing connection to an external power supply.

Figure 5A:
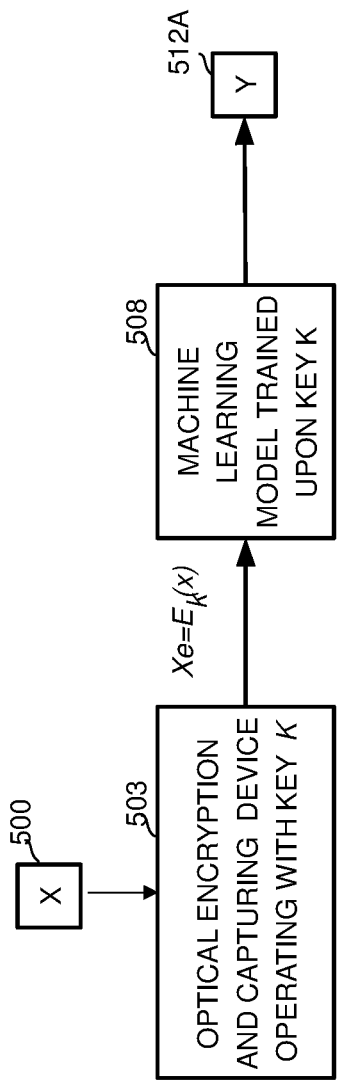
FIG. 5A is a schematic flow for protecting machine learning models, in accordance with some exemplary embodiments of the disclosure.

Further reference is now made to FIG. 5A, showing a schematic flow of protecting machine learning models, in accordance with some exemplary embodiments of the disclosure.

A scene comprising object X 500 is captured and encrypted (block 503), for example by employing optically encrypting imaging device 400. The encryption may be performed with a key K. Key K may indicate, for example, the manipulation performed over the image. For example, key K may indicate the type of manipulation, such as changing the wavelength, changing the phase, and/or the like, and/or a value of the manipulation, such as the new wavelength or the change in wavelength, changing the spatial distribution, the value or change in phase, and/or the like. If the light has undergone multiple types of manipulation, sequentially and/or concurrently, key K may comprise or represent multiple such combinations of manipulations.

The encrypted image may then be provided to a machine learning model 508, such as a DNN, trained upon data associated with encryption key K. Machine learning model 508 may have been trained upon a collection of optically encrypted training images, and/or upon a collection of images that were generated by simulating the optical encryption, each encrypted using key K, and a corresponding label.

Machine learning model 508 can be any publicly known system, and can perform any common image processing task such as classification, detection, segmentation, clustering, deburring, etc. Thus, the architecture of machine learning model 508 may be known to the attacker.

In some examples, the attacker may also know the training procedure and the database used for training. Moreover, the attacker may also investigate the outputs of machine learning model 508 for given inputs introduced to the entire system.

However, key K used for encrypting the training images is hidden from the attacker. Without knowledge of key K, the attacker has no practical way to generate adversarial images and successfully attack the system. Thus, a system employing optical encryption using a key K, and providing a machine learning model 508 trained upon images encrypted with key K, may provide encryption which cannot be hacked by an adversary.

Thus, an attacker trying to apply a standard attack on an object being imaged will fail, since the encryption is designed to eliminate the standard attack, because the model, which is trained on correspondingly encrypted images, will not provide a wrong prediction to such encrypted image. Moreover, the attacker will not be able to develop a specific attack, since he does not have the relevant key K.

Machine learning model 508, after being trained with optically encrypted image datasets and corresponding labels and/or with or an image dataset generated by simulating the optical encryption process, may receive the image data representing the optically encrypted scene image, and may output a correct prediction Y 512A.

It will be appreciated that multiple optical manipulation elements may be used, which provide different values of K. Capturing the images with each such element requires the usage of a corresponding machine learning model, trained upon the same value K. Thus, an image captured and encrypted with key $K_1$ is provided to a machine learning model trained upon images encrypted with $K_1$, an image captured and encrypted with key $K_2$ is provided to a machine learning model trained upon images encrypted with $K_2$, etc.

The keys and corresponding engines may be rotated at predetermined intervals, at random intervals, or the like, thereby further increasing the difficulty of an attacker to develop and use the attacks.

Figure 5B:
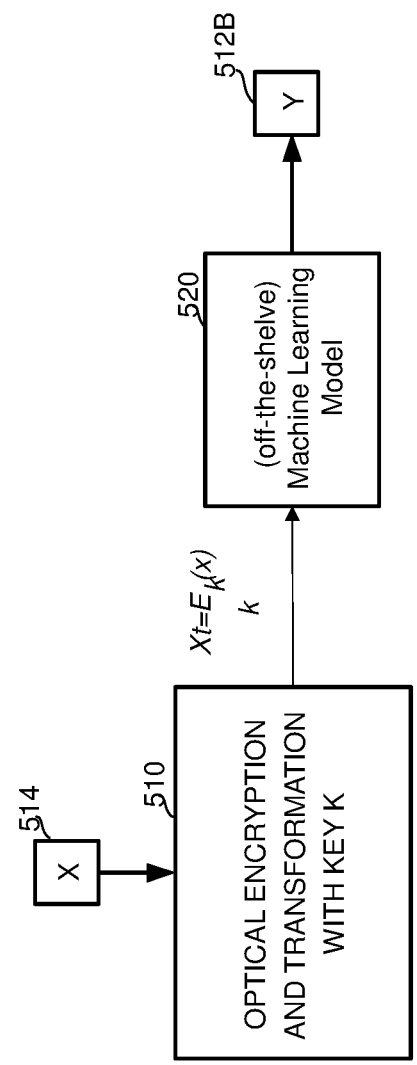
FIG. 5B is another schematic flow for protecting machine learning models, in accordance with some exemplary embodiments of the disclosure.

Referring now to FIG. 5B, showing a schematic flow for protecting machine learning models, in accordance with some exemplary embodiments of the disclosure.

The embodiment of FIG. 5B may be used when the protector is protecting against a known attack type.

The embodiments of FIG. 5B, may be represented by an encryption and reconstruction process ($T_K$ and $R_K$). The functionality of these two processes combined is to remove the attack (the perturbations) to arrive at a transformed and decrypted (or reconstructed) image that resembles but is not identical to the original image without the perturbation.

On 510, attacked scene X 514 is captured, including optically encrypting the attacked image, using for example imaging device 400. The attacked scene may also be transformed, wherein the transformation is intended to remove or deviate a perturbation introduced by an attacker to obtain a transformed image or corresponding transformed image dataset. Such transformation is possible, since the perturbation type is assumed to be known. The optical encryption and transformation are performed with a key K, indicating for example the encryption type and/or other characteristics.

The transformed image does not include the perturbation, or includes a "deviated" perturbation "deviated" perturbation.

Expressed by mathematical terms, an input x is first transformed before presented to the ML algorithm as $$z = T_k(x)$$

The functional role of the optically implemented transform T is to cancel or reduce the effect of the attack. The optically encrypted or performed transformation $T_k(x)$ is designed to change or remove the attacker's carefully crafted perturbation δ to obtain a transformed image, such that the Machine Learning model again produces, based on the transformed image, a correct prediction.

In some examples, the transformation may also include or be followed by a decryption process (using key K) of the encrypted transformation, by a decryption module (not shown), to obtain a transformed and decrypted image as input for the machine learning model.

It is noted that the transformed and decrypted image may be similar but not identical to the original image, since it has been perturbed by the attacker and transformed by the system to remove therefrom or deviate the perturbation.

Optionally, following the optical transformation employed for removing or deviating the attacker's perturbation, decryption may be employed to obtain a transformed & decrypted ML model input image can be performed digitally. For instance, the attacked image may be optically transformed and digitally recovered, e.g., by an algorithm that does not mimic optical decryption.

Optionally, decryption to obtain the transformed and decrypted ML model input image can be performed optically, for example, following the optical transformation employed for removing or deviating the attacker's perturbation, or concurrently, together with the transformation.

The transformed and decrypted image or transformed and decrypted image data obtained in block 510 may be provided to machine learning model 520, such as a DNN.

Optionally, machine learning model 520 may be any off-the-shelf learning model, trained upon non-encrypted images and corresponding labels, and may thus handle well the transformed and decrypted image. In this scenario, the optical encryption on the transformation may prevent counterattacks (also referred to as adaptive attacks) on the transformation employed to remove or deviate the perturbation, since the attacker does not have information about the encryption method or its parameters.

Machine learning model 520 may then receive the decrypted image, and output prediction Y 512B.

As noted above, the removal or deviation of the perturbation to obtain the transformed image data and decryption may not precisely reconstruct the original image prior to the attack. However, the transformation may result in that the machine learning model now produces a correct prediction Y. In some examples, for the transformed and decrypted image data, the prediction Y provided by the machine learning model in 512B may be a less accurate prediction, compared to a prediction that would be obtained if the scene had not been attacked and the scene image was not optically transformed.

In some embodiments, the transformed and decrypted image data shall not represent fully reconstructed image data without the perturbation because, if such scenario were to occur, the input to the ML model could again be easily attacked by an adversary to produce a false prediction.

The optical encryption of the image, as performed by optical encryption and imaging device 400, can perform a linear encoding process, such as DRPE, compressive sensing, or the like, or a nonlinear encoding process, such as photon counting, nonlinear sensors, or the like.

The linear encryption may be inferior to non-linear encryption. However, even the linear encryption may require a substantial effort from the attacker due to the complexity of the combined optical-digital processing, in particular when using keys that typically have high entropies, and therefore spanning a huge key space.

Additional reference is now made to FIG. 6A and FIG. 6B, showing flowcharts of methods for securely analyzing imaged scenes, in accordance with some exemplary embodiments of the disclosure. The methods may be performed, for example by a processor of an imaging device, and/or any other processor adapted to obtain and process image data and apply a machine learning model to the image data.

The methods of FIG. 6A and FIG. 6B may be useful for real-world attacks, where an attacker may manipulate an object to be captured. For example, an attacker may put a sticker on a road sign to perturbate the information originally to be conveyed by the road sign such that a classifier of an autonomous vehicle wrongly classifies the road sign, possibly causing the autonomous vehicle to make a wrong decision and risk the vehicle, its passengers and/or other people or object in the environment.

Referring now to FIG. 6A, in block 604, a scene, which may have been manipulated for example by an attacker, is imaged by an imaging device such as optically encrypting imaging device 400 described above, to obtain a set of optically encrypted image data related to one or more images of the scene.

Optically encrypting imaging device 400 may apply optical manipulations to the light coming from the scene, thereby optically encrypting it and generating a set of optically encrypted image data.

The set may be a description of the image, and may comprise a plurality of values, for example a pixel map in which each pixel is associated with at least one value. The optical encryption may be characterized by or based on an encryption key, which may indicate the optical encryption characteristics.

The optical encryption may be based on one of the following, with respect to light captured by the image acquisition device: a wavelength; a phase; polarization; applying a filter; applying a bandpass filter, applying a low pass filter; applying diffraction; applying spatial geometry changes; diffraction of light; using single random phase keys; using double random phase keys; using pseudo-random phase encoding; compressive imaging; or any combination of the aforesaid.

In block 608, the set of optically encrypted image data may be provided to a trained machine learning model, such as DNN, for example machine learning model 308.

The trained machine learning model may have been trained to perform the required task, and provide a prediction, e.g., classification, detecting a region in the image, segmentation, deblurring, or the like. Said training may be associated with the same encryption key used for encrypting the image-bearing light.

In a non-limiting example, machine learning model 308 may be trained upon a plurality of pairs of training image datasets and labels. Each such pair thus comprises an encrypted training image data, generated by encrypting an image data with the same encryption key as mentioned with respect to block 604 above, and a corresponding label.

It will be appreciated that a specific model may be trained for each encryption key. Additionally or alternatively, a single model may be trained for multiple values of the encryption key, wherein the model may require that in runtime, when prediction is to be provided upon data, the encryption key is to be supplied with the encrypted data.

As indicated by block 612, the trained machine learning model may process the set of optically encrypted image data, to provide a prediction which the model has been trained to provide, such as a classification, region detection, segmentation, deblurring, or the like.

Referring now to FIG. 6B, as indicated by block 616, a scene is imaged by an imaging device such as optically encrypting imaging device 400 described above, to obtain a set of optically encrypted transformed image data describing a scene.

The scene may comprise a perturbated or manipulated object, such that the acquired scene light comprises object information, including the perturbation characteristics applied to the perturbated or manipulated object. It will be appreciated that the perturbations or manipulations applied to the object may have been performed in order to deceive an off-the-shelf machine learning model to wrongly classify the imaged object.

Imaging the scene may comprise optically encrypting and transforming the imaged scene light, wherein transforming the light is designed to remove or filter out the perturbation characteristics from the incoming light. In some examples, optical manipulation of image-bearing light encoding a perturbated image may include optical encryption of the transformation in a single or a same step. In other words, in some examples, the transformation performed to remove or deviate the perturbation may be optically encrypted.

The encryption of the transformation may be associated with an encryption key. For example, if it is known that the scene manipulation comprises introducing high frequencies to the scene, a possible transformation may include applying a low pass filter, which may for instance be implemented by a multilayer unit that blurs that incoming image-bearing light, or by a suitable assembly of lenses and a mask with a pinhole.

Applying the low pass filter removes the high frequency components from the incoming image-bearing light, thereby removing or substantially removing the manipulation applied to the scene or object in the scene, from the incoming image-bearing light. This transformation may be encrypted, for example, by scrambling the rows of the filtering matrix, wherein the order of the rows is the encryption key of the transformation.

It will be appreciated that the encryption and transformation may be performed concurrently, encryption followed by transformation, transformation followed by encryption, or with interleaved processes or steps.

The defense of encrypting the transformation may prevent the adversary from analyzing how the defender removes the perturbation from the imaged object, and the attacker cannot counterattack the defense since the attacker does not know which defense on the transformation for removing or deviating the perturbation was employed, and how. In some examples, decryption may have to be employed using a key K to obtain a transformed and decrypted image that can be input into a machine learning model to provide a correct prediction.

In other words, the transformation used for removing the perturbation from the object is unknown to the attacker. In the examples described herein which describe attacks and corresponding defenses in conjunction with spatial frequencies, the mere application of the low-pass filter is concealed from the attacker, because the transformation is performed with respect to the optically encrypted image information.

As indicated by block 620, following the encryption and transformation for effecting removal or substantial removal or deviation of the attacker's perturbation, the optically encrypted transformed image information produces a set of transformed image data from which the perturbation is eliminated, substantially eliminated or deviated, which is then provided, optionally following decryption, to a machine learning model to obtain a prediction. The prediction may correctly characterize the scene, regardless of the adversary attack, and correctly perform scene image classification, scene image segmentation, deblurring and/or the like.

Ideally, the perturbation applied on the object is not removed entirely, while all other features of the scene are the same as would be hadn't the perturbation taken place. However, this is not always feasible. In the frequency-based perturbation introduction and removal example, the original scene may comprise some high frequencies in addition to those added by the adversary. Those frequencies are removed by the low pass filter, and may not be fully reconstructed, possibly causing comparatively less reliable prediction on the transformed and decrypted image. However, the transformed and decrypted image may still bear enough similarity to the original scene such that the machine learning model outputs a correct prediction (e.g., classification) of the perturbated object being imaged.

As already mentioned herein, the transformed and decrypted image data may not represent fully reconstructed image data without the perturbation because, in such scenario, the input to the ML model could again be easily attacked by an adversary to produce a false prediction.

It will be appreciated that performing block 620 may require knowledge of the encryption key based on which the transformation was performed.

Using the method outlined with respect to FIG. 6B, no particular training of a machine learning model with encrypted image datasets and corresponding labels is required. Accordingly, an off-the-shelf machine learning model may be used to obtain correct prediction It will be appreciated that the methods of FIG. 6A and FIG. 6B may also be applied in situations other than in those where an adversary introduces an attack such as a perturbation to the real world scene being captured for analysis purposes. For example, in pre-acquired images, such as in medical databases storing images to be analyzed, an adversary may perturbate or corrupt a digital image such that a machine learning model will output a wrong prediction. In another example, a digital image of a corrupted scene may be obtained by an imaging device without employing the current disclosure, and provided to a machine learning model, which would then output a wrong prediction.

In embodiments where a perturbed digital image is readily available, and optical image acquisition may be irrelevant or superfluous, encryption method may be applied digitally to emulate or simulate optical encryption. For example, in accordance with the method of FIG. 6A, the digital image may be digitally processed to emulate or simulate the optical encryption to generate an optically encrypted image dataset, which is then input to a machine learning model trained on encrypted images or encrypted image data encrypted in the same manner.

In another example, in accordance with the method of FIG. 6B, the perturbed digital image may be digitally processed to emulate or simulate the optical encryption and transformation to produce a transformed image dataset from with deviated perturbation or from which perturbation is removed.

Based on the transformed image dataset, a machine learning model, which may be an off-the-shelf machine learning model, may produce a correct prediction with respect to the transformed image dataset.

In some embodiments, the schemes, methods, and/or processes above may be used for secure microscopic imaging, for example as used in biomedical imaging including, for example, tissue analysis (e.g., malignant or non-malignant). Cyber physical security may be crucial due to the privacy and sensitivity in this field is, and the vulnerability to adversarial attacks which may be a matter of life and death. In such uses, DRPE or Single Random Phase Encoding (SRPE) scheme may be used to encrypt a microscopy image, for example.

In another example, the schemes above may be used for preventing attack on Laser Imaging, Detection, and Ranging (LiDAR) systems, such as used in autonomous vehicles. Such attack may attempt to cause misinterpretation of the environment of a vehicle, and thus severe damage to the, the driver, the vehicle or other persons and/or objects in the vicinity of the vehicle.

The disclosed scheme provides technical effects and exhibits a plurality of advantages over the common digital defense approach, thereby improving the security of the underlying systems. The disclosed scheme provides higher robustness and may prevent a common scenario in which a defense stimulates new attacks, thus breaking the defender-attacker arm race.

First, the data used for training is optically encrypted prior to the training process, which makes the machine learning algorithm robust, since it cannot be attacked without access to the optical hardware representing the key.

Second, the combination of diverse modalities, provided by the optical hardware encryption and digital model, introduces robustness by making the system more complex and less accessible for the attacker. This is generally considered safer than post-acquisition software encryption, which is more vulnerable to, for example, to computerized brute-force or KPA attacks, as the hacking process that must be executed when employing optical encryption or software-based optical encryption is much more arduous and time consuming.

Furthermore, the proposed encryption introduces asymmetry between the defending and attacking tools because the defender has designed the optical encryption (e.g., optical hardware), whereas in a brute force hacking scenario, the attacker would have to gain physical access to the optical hardware and interrogate, sabotage, or replace it.

Third, the optical encryption may allow for a very large combination of different optical parameter values, resulting in a correspondingly complex encryption key, which would be extremely difficult, if not impossible, to reverse-engineer. Further, it is possible to use optical encryption techniques which prevent the formulation of a differentiable mathematical model for the overall encryption and model process, such as photon counting DRPE, thereby disabling attack approaches that are essentially based on differentiable models.

It will be appreciated that the current disclosure can be implemented in conjunction with any other encryption method currently known or that will be known in the future, and in particular in conjunction with any computerized software and/or hardware-implemented encryption applied to the captured image.

The current disclosure may provide defense against attacks on any type of images, including 2 dimensional images, 3 dimensional image-data (e.g., voxels), spectral images, polarimetric images, a sequence of images such as video frames or the like, on images taken in all spectral regimes from Ultraviolet, visible, near InfraRed, and Infrared to Terahertz, and may be combined with any coherent or incoherent imaging system.

Experimental Results

Figure 7:
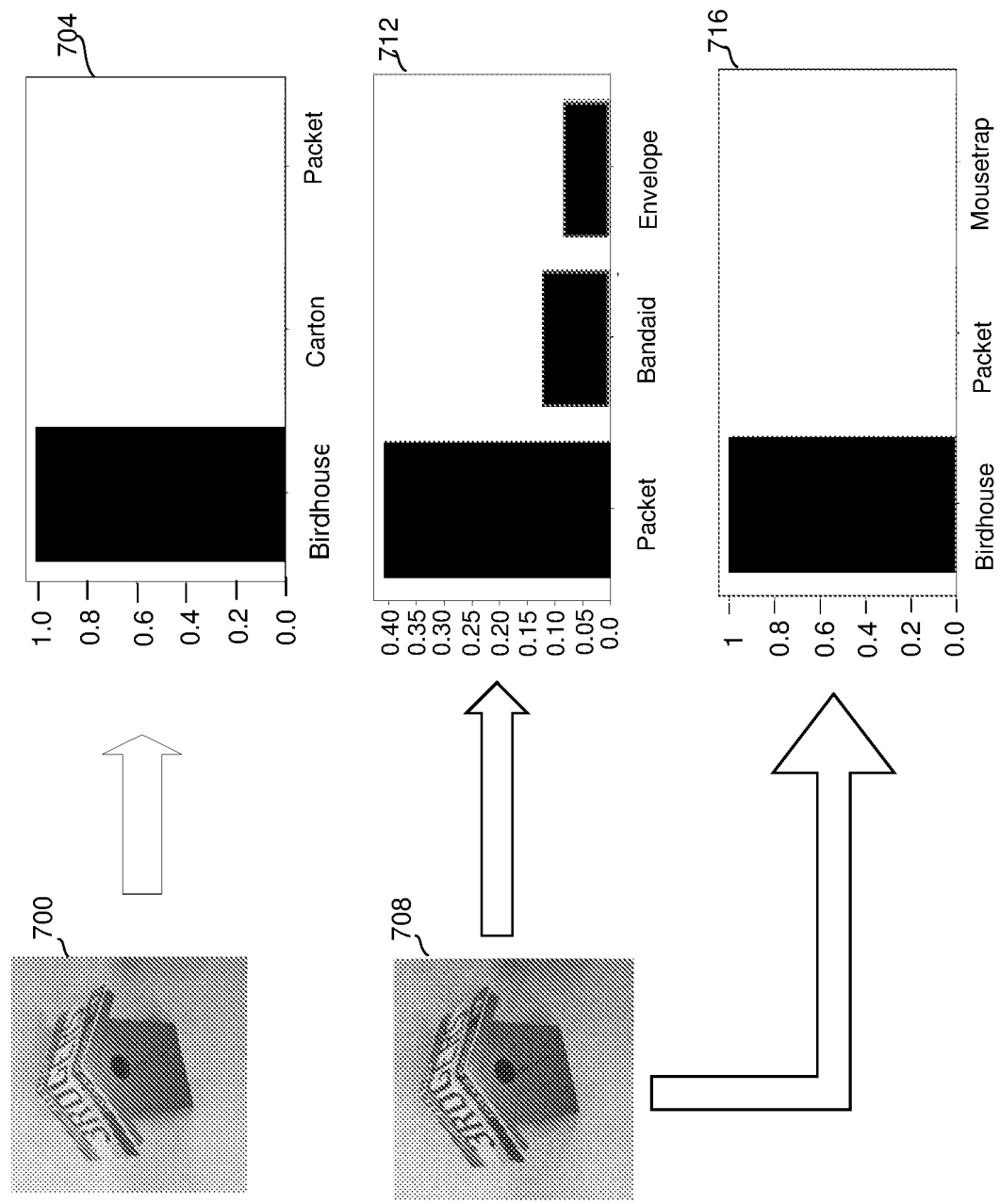
FIG. 7 shows experimental results of an image classifier system, in accordance with some exemplary embodiments of the disclosure the disclosure.

Reference is now made to FIG. 7, showing experimental results of a system similar to the system in accordance with some exemplary embodiments of the disclosure the disclosure.

Object 700, being a bird house has been captured and provided to a trained DNN, being an off-the-shelf Resnet classifier, for classification as a bird house, a carton, a packet (also: package) or a band aid. Graph 704 shows the classification results, wherein the trained DNN recognized the non-attacked object correctly as a bird house with a confidence level of almost 100%.

After manipulating the scene, in a manner which an adversary may have tried, for example presenting to the classifier an image 708 of the object rather than the object itself, the DNN's top classification choice is "packet", with a confidence much larger than that of its second choice, as schematically illustrated in graph 712.

However, when applying the currently disclosed scheme, the confidence level of the correct answer, as shown in graph 716 resumed the classification of "bird house" with a confidence rate of almost 100%, as before the perturbation was introduced.

Additional Examples

Aspects of embodiments pertain to a method for analyzing a scene comprising one or more objects. In Example 1, the method may comprise: obtaining a set of optically encrypted image data describing a scene, including applying an optical manipulation to light incoming to an image acquisition device, whereby the image acquisition device outputs the set of optically encrypted image data, and wherein the optical manipulation is characterized by or based on an encryption key; providing the set of optically encrypted image data to a machine learning model trained in accordance with the key; and receiving from the machine learning model a prediction related to the scene.

Example 2 includes the subject matter of Example 1 and, optionally, wherein the machine learning model comprises a DNN.

Example 3 includes the subject matter of examples 1 and/or 2 and, optionally, wherein the optical encryption is performed by optical elements for implementing the optical encryption.

Example 4 includes the subject matter of any one or more of the Examples 1 to 3 and, optionally, wherein the image acquisition device is a hyperspectral camera, and wherein the encryption key characterizes the imaging characteristics of the hyperspectral camera.

Example 5 includes the subject matter of any one or more of the Examples 1 to 4 and, optionally, wherein the machine learning model is a classifier, and analysis of the scene comprises providing a classification of the acquired scene image.

Example 6 includes the subject matter of any one or more of the examples 1 to 5 and, optionally, wherein the machine learning model was trained with a plurality of pairs, each pair comprising a set of encrypted training image data and a corresponding label, wherein the set of encrypted training image data was generated by encrypting a set of image data that is descriptive of the acquired scene, with the key.

Example 7 includes the subject matter of any one or more of the examples 1 to 6 and, optionally, wherein the optical encryption is based on one of the following, with respect to image-bearing light captured by the image acquisition device: a wavelength; a phase; polarization; applying a filter; applying a bandpass filter, applying a low pass filter; applying diffraction; applying spatial geometry changes; diffraction of light; reflection of light; using single random phase keys; using double random phase keys; randomizing the acquisition sequence; using pseudo-random phase encoding; compressive imaging; or any combination of the aforesaid.

Example 8 includes the subject matter of any one or more of the examples 3 to 7 and, optionally, wherein parameter values of an optical element for performing the optical encryption may be selectively controllable.

Example 9 includes the subject matter of any one or more of the examples 1 to 8 and, optionally, wherein the optical encryption performs parallel optical processing of a region of the scene of the entire scene being imaged.

Example 10 includes the subject matter of any one or more of the examples 1 to 9 and, optionally, wherein the optical encryption is performed by an image acquisition device employed by a mobile platform or a stationary platform.

Example 11 includes the subject matter of any one or more of the examples 1 to 10 and, optionally, wherein the optical encryption is performed by an image acquisition device employed by a vehicle, and wherein the analysis of the scene is used for taking driving decisions.

Example 12 pertains to a method for analyzing a scene comprising one or more objects, the method comprising: obtaining a set of optically encrypted image data describing a scene, wherein the set of optically encrypted image data is produced by an image acquisition device configured to optically encrypt and transform image-bearing light received from the scene, wherein transforming the image-bearing light is designed to remove or filter out perturbation introduced to the scene, wherein the optical encryption is characterized by or based on an encryption key; processing the set of optically encrypted image data using the key, to obtain a set of transformed and decrypted image data of the scene; and providing the set of transformed and decrypted image data to a machine learning model to obtain a prediction related to the scene.

Example 13 includes the subject matter of example 12 and, optionally, wherein the machine learning model is an off-the-shelve machine learning model.

Example 14 includes the subject matter of examples 12 and/or 13 and, optionally, wherein parameter values for performing the optical encryption and transformation are selectively controllable.

Example 15 includes the subject matter of any one or more of the examples 12 to 14 and, optionally, wherein the machine learning model comprises a DNN.

Example 16 includes the subject matter of any one or more of the examples 12 to 15 and, optionally, wherein the optical encryption is performed by optical elements for implementing the optical encryption.

Example 17 includes the subject matter of any one or more of the examples 12 to 16 and, optionally, wherein the image acquisition device is a hyperspectral camera, and wherein the encryption key characterizes the imaging characteristics of the hyperspectral camera.

Example 18 includes the subject matter of any one or more of the examples 12 to 17 and, optionally, wherein the machine learning model is a classifier, and analysis of the scene comprises providing a classification of the object in the scene.

Example 19 includes the subject matter of any one or more of the examples 12 to 18 and, optionally, wherein the optical encryption is based on one of the following, with respect to image-bearing light captured by the image acquisition device: a wavelength; a phase; polarization; applying a filter; applying a bandpass filter, applying a low pass filter; applying diffraction; applying spatial geometry changes; diffraction of light; reflection of light; using single random phase keys; using double random phase keys; randomizing the acquisition sequence; using pseudo-random phase encoding; compressive imaging; or any combination of the aforesaid.

Example 20 includes the subject matter of any one or more of the examples 12 to 19 and, optionally, wherein the optical encryption is performed using parallel processing for one or more regions of the scene being imaged.

Example 21 includes the subject matter of any one or more of the examples 12 to 20 and, optionally, wherein the optical encryption is performed by an image acquisition device employed by a mobile platform or a stationary platform.

Example 22 includes the subject matter of any one or more of the examples 12 to 21 and, optionally, wherein the optical encryption is performed by an image acquisition device employed by a vehicle, and wherein the analysis of the scene is used for taking driving decisions.

Example 23 pertains to a method for analyzing an image comprising one or more objects, the method comprising: obtaining a set of image data from a pre-acquired image relating to a scene, including emulating an optical encryption characterized by or based on an encryption key, to the pre-acquired image to obtain a set of encrypted image data; providing the set of encrypted image data to a machine learning model trained in accordance with the encryption key; and receiving from the machine learning model a prediction related to the pre-acquired image.

Example 24 includes the subject matter of example 23 and, optionally, wherein the machine learning model comprises a DNN.

Example 25 includes the subject matter of examples 23 and/or 24 and, optionally, wherein the machine learning model is a classifier, and analysis of the set of image data comprises providing a classification of an object described by the pre-acquired image data.

Example 26 includes the subject matter of any one or more of the examples 23 to 25 and, optionally, wherein the set of image data are descriptive of medical image information.

Example 27 includes the subject matter of any one or more of the examples 23 to 26 and, optionally, wherein the machine learning model was trained with a plurality of pairs, each pair from the plurality of pairs comprising a set of encrypted training image data and a corresponding label, wherein the set of encrypted training image data is generated by encrypting a set of image data with the key.

Example 28 pertains to method for analyzing an image comprising one or more objects, the method comprising:
receiving a pre-acquired and perturbed image;
processing the pre-acquired and perturbed image to emulate or simulate an optical encryption characterized by or based on an encryption key and a transformation designed to deviate or filter out perturbation introduced to create the pre-acquired and perturbed image to obtain a set of transformed image data;
processing the set of transformed image data to provide a set of transformed and decrypted image data to a machine learning model; and
receiving from the machine learning model a prediction related to the pre-acquired and perturbed transformed image, wherein the prediction is a correct prediction for the unperturbed image.

Example 29 includes the subject matter of example 28 and, optionally, wherein the machine learning model comprises a DNN.

Example 30 includes the subject matter of Examples 28 and/or 29 and, optionally, wherein the machine learning model is a classifier, and analysis of the scene comprises providing a classification of the acquired scene image.

Example 31 pertains to an apparatus for analyzing a scene comprising one or more objects, the apparatus comprising: a memory configured to store software code instructions; and a processor configured to execute instructions stored in the memory to perform steps of any one or more of the examples 1 to 30.

Example 32 includes an apparatus for analyzing a scene comprising one or more objects, the apparatus comprising: a memory storing software code instructions; and a processor configured to execute the software code instructions stored in the memory to perform the following:
 obtaining a set of optically encrypted image data describing a scene, including applying an optical manipulation to light incoming to an image acquisition device, whereby the image acquisition device outputs the set of optically encrypted image data, and wherein the optical manipulation is characterized by or based on an encryption key; providing the set of optically encrypted image data to a machine learning model trained in accordance with the encryption key; and receiving from the machine learning model a prediction related to the scene.

Example 33 includes the subject matter of example 32 and, optionally, wherein the machine learning model comprises a DNN.

Example 34 includes the subject matter of examples 32 and/or 33 and, optionally, wherein optical encryption is performed by optical elements for implementing the optical encryption.

Example 35 includes the subject matter of any one or more examples 32 to 34 and, optionally, wherein the image acquisition device is a hyperspectral camera, and wherein the encryption key characterizes imaging characteristics of the hyperspectral camera.

Example 36 includes the subject matter of any one or more of the examples 32 to 35 and, optionally, wherein the machine learning model is a classifier, and analysis of the scene comprises classifying the acquired scene image.

Example 37 includes the subject matter of any one or more of the examples 32 to 36 and, optionally, wherein the machine learning model was trained with a plurality of training data-and-label pairs, each pair comprising a set of encrypted training image data and a corresponding label, wherein the set of encrypted training image data was generated by encrypting a set of image data, descriptive of the acquired scene, with the encryption key.

Example 38 an apparatus for analyzing a scene comprising one or more objects, the apparatus comprising: a memory storing software code instructions; and a processor configured to execute the software code instructions stored in the memory to perform the following: obtaining a set of optically encrypted image data describing a scene, wherein the set of optically encrypted image data is produced by an image acquisition device configured to optically encrypt and transform image-bearing light received from the scene, wherein transforming the image-bearing light is designed to remove or filter out perturbation introduced to the scene, wherein the optical encryption is characterized by or based on an encryption key; processing the set of optically encrypted image data using the encryption key, to obtain a set of transformed and decrypted image data of the scene; and providing the set of transformed and decrypted image data to a machine learning model to obtain a prediction related to the scene. The image acquisition device may be part of the apparatus or separate from the apparatus.

Example 39 includes the subject matter of Example 38 and, optionally, wherein the machine learning model is an off-the-shelve machine learning model.

Example 40 includes the subject matter of example 38 and/or 39 and, optionally, wherein parameter values for performing the optical encryption and transformation may be selectively controllable.

Example 41 includes the subject matter of any one or more of the examples 38 to 40 and, optionally, wherein the machine learning model comprises a DNN.

Example 42 includes the subject matter of any one or more of the examples 38 to 41 and, optionally, wherein the optical encryption is performed by optical elements for implementing the optical encryption.

Example 43 includes the subject matter of any one or more of the examples 38 to 42 and, optionally, wherein the machine learning model is a classifier, and analysis of the scene comprises providing a classification of the object in the scene.

Example 44 includes an apparatus for analyzing a scene comprising one or more objects, the apparatus comprising: a memory storing software code instructions; and a processor configured to execute the software code instructions stored in the memory to perform the following: obtaining a set of image data from a pre-acquired image relating to a scene, including emulating an optical encryption characterized by or based on an encryption key, to the pre-acquired image to obtain a set of encrypted image data; providing the set of encrypted image data to a machine learning model trained in accordance with the encryption key; and receiving from the machine learning model a prediction related to the pre-acquired image.

Example 45 includes the apparatus of example 44 and, optionally, wherein the set of image data are descriptive of medical image information.

Example 46 includes the subject matter of examples 44 and/or 45 and, optionally, wherein the machine learning model was trained with a plurality of pairs, each pair from the plurality of pairs comprising a set of encrypted training image data and a corresponding label, wherein the set of encrypted training image data is generated by encrypting a set of image data with the encryption key.

Example 47 includes an apparatus for analyzing a scene comprising one or more objects, the apparatus comprising: a memory storing software code instructions; and a processor configured to execute the software code instructions stored in the memory to perform the following:
 receiving a pre-acquired and perturbed image; processing the pre-acquired and perturbed image to emulate an optical encryption characterized by or based on an encryption key and a transformation designed to deviate or filter out perturbation introduced to create the pre-acquired and perturbed image to obtain a set of transformed image data; processing the set of image data using the encryption key, to obtain a set of transformed and decrypted image data; providing the set of transformed and decrypted image data to a machine learning model; and receiving from the machine learning model a prediction related to the pre-acquired and perturbed transformed image, wherein the prediction is a correct prediction for the unperturbed image.

Example 48 includes the subject matter of example 47 and, optionally, wherein the machine learning model comprises a DNN.

Example 49 includes the subject matter of examples 47 and/or 48 and, optionally, wherein the machine learning model is a classifier, and analysis of the scene comprises providing a classification of the acquired scene image.

It is important to note that the methods described herein and illustrated in the accompanying diagrams shall not be construed in a limiting manner. For example, methods described herein may include additional or even fewer processes or operations in comparison to what is described herein and/or illustrated in the diagrams. In addition, method steps are not necessarily limited to the chronological order as illustrated and described herein.

Any digital computer system, unit, device, module and/or engine exemplified herein can be configured or otherwise programmed to implement a method disclosed herein, and to the extent that the system, module and/or engine is configured to implement such a method, it is within the scope and spirit of the disclosure. Once the system, module and/or engine are programmed to perform particular functions pursuant to computer readable and executable instructions from program software that implements a method disclosed herein, it in effect becomes a special purpose computer particular to embodiments of the method disclosed herein. The methods and/or processes disclosed herein may be implemented as a computer program product that may be tangibly embodied in an information carrier including, for example, in a non-transitory tangible computer-readable and/or non-transitory tangible machine-readable storage device. The computer program product may directly loadable into an internal memory of a digital computer, comprising software code portions for performing the methods and/or processes as disclosed herein.

The methods and/or processes disclosed herein may be implemented as a computer program that may be intangibly embodied by a computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

These computer readable and executable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable and executable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The term "engine" may comprise one or more computer modules, wherein a module may be a self-contained hardware and/or software component that interfaces with a larger system. A module may comprise a machine or machines executable instructions. A module may be embodied by a circuit or a controller programmed to cause the system to implement the method, process and/or operation as disclosed herein. For example, a module may be implemented as a hardware circuit comprising, e.g., custom VLSI circuits or gate arrays, an Application-specific integrated circuit (ASIC), off-the-shelf semiconductors such as logic chips, transistors, and/or other discrete components. A module may also be implemented in programmable hardware devices such as field programmable gate arrays, programmable array logic, programmable logic devices and/or the like.

The term "random" also encompasses the meaning of the term "substantially randomly" or "pseudo-randomly".

The expression "real-time" as used herein generally refers to the updating of information based on received data, at essentially the same rate as the data is received, for instance, without user-noticeable judder, latency or lag.

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

Unless otherwise specified, the terms "substantially", "about" and/or "close" with respect to a magnitude or a numerical value may imply to be within an inclusive range of −10% to +10% of the respective magnitude or value.

"Coupled with" can mean indirectly or directly "coupled with".

It is important to note that the method may include is not limited to those diagrams or to the corresponding descriptions. For example, the method may include additional or even fewer processes or operations in comparison to what is described in the figures. In addition, embodiments of the method are not necessarily limited to the chronological order as illustrated and described herein.

Discussions herein utilizing terms such as, for example, "processing", "computing", "calculating", "determining", "establishing", "analyzing", "checking", "estimating", "deriving", "selecting", "inferring" or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. The term determining may, where applicable, also refer to "heuristically determining".

It should be noted that where an embodiment refers to a condition of "above a threshold", this should not be construed as excluding an embodiment referring to a condition of "equal or above a threshold". Analogously, where an embodiment refers to a condition "below a threshold", this should not be construed as excluding an embodiment referring to a condition "equal or below a threshold". It is clear that should a condition be interpreted as being fulfilled if the value of a given parameter is above a threshold, then the same condition is considered as not being fulfilled if the value of the given parameter is equal or below the given threshold. Conversely, should a condition be interpreted as being fulfilled if the value of a given parameter is equal or above a threshold, then the same condition is considered as not being fulfilled if the value of the given parameter is below (and only below) the given threshold.

It should be understood that where the claims or specification refer to "a" or "an" element and/or feature, such reference is not to be construed as there being only one of that element. Hence, reference to "an element" or "at least one element" for instance may also encompass "one or more elements".

Terms used in the singular shall also include the plural, except where expressly otherwise stated or where the context otherwise requires.

In the description and claims of the present application, each of the verbs, "comprise" "include" and "have", and conjugates thereof, are used to indicate that the data portion or data portions of the verb are not necessarily a complete listing of components, elements or parts of the subject or subjects of the verb.

Unless otherwise stated, the use of the expression "and/or" between the last two members of a list of options for selection indicates that a selection of one or more of the listed options are appropriate and may be made. Further, the use of the expression "and/or" may be used interchangeably with the expressions "at least one of the following", "any one of the following" or "one or more of the following", followed by a listing of the various options.

As used herein, the phrase "A,B,C, or any combination of the aforesaid" should be interpreted as meaning all of the following: (i) A or B or C or any combination of A, B, and C, (ii) at least one of A, B, and C; (iii) A, and/or B and/or C, and (iv) A, B and/or C. Where appropriate, the phrase A, B and/or C can be interpreted as meaning A, B or C. The phrase A, B or C should be interpreted as meaning "selected from the group consisting of A, B and C". This concept is illustrated for three elements (i.e., A,B,C), but extends to fewer and greater numbers of elements (e.g., A, B, C, D, etc.).

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementations are not to be considered essential features of those embodiments, unless the embodiment, example and/or optional implementation is inoperative without those elements.

It is noted that the terms "in some embodiments", "according to some embodiments", "for example", "e.g.,", "for instance" and "optionally" may herein be used interchangeably.

The number of elements shown in the Figures should by no means be construed as limiting and is for illustrative purposes only.

"Real-time" as used herein generally refers to the updating of information at essentially the same rate as the data is received. More specifically, in the context of the present invention "real-time" is intended to mean that the image data is acquired, processed, and transmitted from a sensor at a high enough data rate and at a low enough time delay that when the data is displayed, data portions presented and/or displayed in the visualization move smoothly without user-noticeable judder, latency or lag.

It is noted that the terms "operable to" can encompass the meaning of the term "modified or configured to". In other words, a machine "operable to" perform a task can in some embodiments, embrace a mere capability (e.g., "modified") to perform the function and, in some other embodiments, a machine that is actually made (e.g., "configured") to perform the function.

Throughout this application, various embodiments may be presented in and/or relate to a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

While the invention has been described with respect to a limited number of embodiments, these should not be construed as limitations on the scope of the invention, but rather as exemplifications of some of the embodiments.

What is claimed is:

1. An apparatus for analyzing a scene comprising one or more objects, the apparatus comprising:
   a memory storing software code instructions; and
   a processor configured to execute the software code instructions stored in the memory to perform the following:
   a) obtaining a set of optically encrypted image data describing a scene, including applying an optical manipulation to light incoming to an image acquisition device, whereby the image acquisition device outputs the set of optically encrypted image data, and wherein the optical manipulation is characterized by an encryption key;
   b) providing the set of optically encrypted image data to a machine learning model trained in accordance with the encryption key; and
   c) receiving from the machine learning model a prediction related to the scene.

2. The apparatus of claim 1, wherein the machine learning model comprises a DNN.

3. The apparatus of claim 1, wherein optical encryption is performed by optical elements for implementing the optical encryption.

4. The apparatus of claim 1, wherein the image acquisition device is a hyperspectral camera, and wherein the encryption key characterizes imaging characteristics of the hyperspectral camera.

5. The apparatus of claim 1, wherein the machine learning model is a classifier, and analysis of the scene comprises classifying the acquired scene image.

6. The apparatus of claim 1, wherein the machine learning model was trained with a plurality of training data-and-label pairs, each pair comprising a set of encrypted training image data and a corresponding label, wherein the set of encrypted training image data was generated by encrypting a set of image data, descriptive of the acquired scene, with the encryption key.

7. An apparatus for analyzing a scene comprising one or more objects, the apparatus comprising:
 a memory storing software code instructions; and
 a processor configured to execute the software code instructions stored in the memory to perform the following:
 obtaining a set of optically encrypted image data describing a scene, wherein the set of optically encrypted image data is produced by an image acquisition device configured to optically encrypt and transform image-bearing light received from the scene, wherein transforming the image-bearing light is designed to remove or filter out perturbation introduced to the scene, wherein the optical encryption is characterized by an encryption key;
 processing the set of optically encrypted image data using the encryption key, to obtain a set of transformed and decrypted image data of the scene; and
 providing the set of transformed and decrypted image data to a machine learning model to obtain a prediction related to the scene.

8. The apparatus of claim 7, wherein the machine learning model is an off-the-shelve machine learning model.

9. The apparatus of claim 7, wherein parameter values for performing the optical encryption and transformation may be selectively controllable.

10. The apparatus of claim 7, wherein the machine learning model comprises a DNN.

11. The apparatus of claim 7, wherein the optical encryption is performed by optical elements for implementing the optical encryption.

12. The apparatus of claim 7, wherein the machine learning model is a classifier, and analysis of the scene comprises providing a classification of the object in the scene.

13. An apparatus for analyzing a scene comprising one or more objects, the apparatus comprising:
 a memory storing software code instructions; and
 a processor configured to execute the software code instructions stored in the memory to perform the following:
 obtaining a set of image data from a pre-acquired image relating to a scene, including emulating an optical encryption characterized by an encryption key, to the pre-acquired image to obtain a set of encrypted image data;
 providing the set of encrypted image data to a machine learning model trained in accordance with the encryption key; and
 receiving from the machine learning model a prediction related to the pre-acquired image.

14. The apparatus of claim 13, wherein the set of image data are descriptive of medical image information.

15. The apparatus of claim 13, wherein the machine learning model was trained with a plurality of pairs, each pair from the plurality of pairs comprising a set of encrypted training image data and a corresponding label,
 wherein the set of encrypted training image data is generated by encrypting a set of image data with the encryption key.

16. The Apparatus of claim 13, wherein the machine learning model includes a DNN.

17. The apparatus of claim 13, wherein the machine learning model is a classifier.

18. The apparatus of claim 13, wherein the pre-acquired image is a perturbed pre-acquired image,
 wherein the apparatus is configured to process the pre-acquired and perturbed image to emulate the optical encryption characterized by the encryption key and a transformation designed to deviate or filter out perturbation introduced to create the pre-acquired and perturbed image to obtain a set of transformed image data.

19. The apparatus of claim 13, wherein parameter values for performing the optical encryption and transformation are selectively controllable.

20. The apparatus of claim 13, wherein the machine learning model is an off-the-shelve machine learning model.

* * * * *